United States Patent [19]
Cathey, Jr. et al.

[11] Patent Number: 6,021,005
[45] Date of Patent: Feb. 1, 2000

[54] ANTI-ALIASING APPARATUS AND METHODS FOR OPTICAL IMAGING

[75] Inventors: Wade Thomas Cathey, Jr., Boulder; Edward Raymond Dowski, Jr., Lafayette, both of Colo.

[73] Assignee: University Technology Corporation, Boulder, Colo.

[21] Appl. No.: 09/005,374

[22] Filed: Jan. 9, 1998

[51] Int. Cl.[7] .............................. G02B 3/00; G02B 9/00
[52] U.S. Cl. ..................... 359/737; 359/738; 348/342
[58] Field of Search ......................... 359/737, 738, 359/739; 250/201.9, 216; 348/335, 340, 342

[56] References Cited

U.S. PATENT DOCUMENTS

| | | | |
|---|---|---|---|
| 2,959,105 | 11/1960 | Sayanagi . | |
| 4,480,896 | 11/1984 | Kubo et al. | 350/431 |
| 4,575,193 | 3/1986 | Greivenkamp, Jr. | 350/401 |
| 4,804,249 | 2/1989 | Reynolds et al. | 350/437 |
| 4,989,959 | 2/1991 | Plummer | 350/447 |
| 5,270,825 | 12/1993 | Takasugi et al. | 358/209 |
| 5,299,275 | 3/1994 | Jackson et al. | 385/116 |
| 5,438,366 | 8/1995 | Jackson et al. | 348/342 |
| 5,444,574 | 8/1995 | Ono et al. | 359/738 |
| 5,555,129 | 9/1996 | Konno et al. | 359/569 |
| 5,568,197 | 10/1996 | Hamano | 348/342 |
| 5,706,139 | 1/1998 | Kelly | 359/737 |

FOREIGN PATENT DOCUMENTS

| | | |
|---|---|---|
| 0618473 | 3/1994 | European Pat. Off. . |
| 0759573 | 8/1996 | European Pat. Off. . |
| 0791846 | 2/1997 | European Pat. Off. . |

OTHER PUBLICATIONS

"Preferred Sharpness of Photographic Color Images," Journal of Imaging Systems, vol. 29: No. 6 (Nov./Dec. 1985), p. 215.

Greivenkamp, John E., "Color Dependent Optical Prefilter for the Suppression of Aliasing Artifacts," Applied Optics, vol. 29: No. 5 (Feb. 10, 1990), pp. 676–684.

Cathey, Wade T., and Edward Raymond Dowski, "Extended Depth of Field Optical Systems," International Application published under the Patent Cooperation Treaty, assigned International Application No. PCT/US96/01514 and International Publication No. WO 96/24085.

Primary Examiner—Cassandra Spyrou
Assistant Examiner—Darren E. Schuberg
Attorney, Agent, or Firm—Jennifer L. Bales; Macheledt Bales & Johnson LLP

[57] ABSTRACT

An anti-aliasing filter for use in an incoherent imaging system reduces the resolution of the optical image to prevent aliasing, without requiring a reduction in the amount of light captured by the system, and without adversely affecting image quality or requiring complex optical systems. The filter modifies the wavefront of light emanating from the object in a curved, non-symmetrical manner, in such a way as to effectively attenuate spatial frequencies in the image to values less than some desired small level for all spatial frequencies beyond a predetermined bandlimit. The filter may be reflective or transmissive.

24 Claims, 11 Drawing Sheets

PIXEL SIZE: 12 X 6 MICRONS

ANTI-ALIASING APPARATUS AND METHODS FOR OPTICAL IMAGING

BACKGROUND OF THE INVENTION

1. Field of the Invention

The present invention relates to apparatus and methods for reducing the spatial resolution of an optical image prior to detection to reduce image aliasing.

2. Description of the Prior Art

In conventional cameras, the lens forms an image of the object on film, where the image is recorded. In digital cameras, the film is replaced by an electronic detector such as a charge coupled device (CCD) or CMOS. An ideal lens that has a small F-number (focal length divided by lens diameter) captures more light and produces an image with higher spatial resolution than does an ideal lens with a large F-number. The amount of light that is captured increases as the square of the aperture diameter, and the theoretical spatial resolution increases linearly with the aperture diameter.

At some point, however, the spatial resolution of the recorded image is limited by the spatial resolution of the digital detector or the spacing of the detector elements. Consequently, increasing the aperture size increases the amount of light gathered, but does not increase the overall spatial resolution of the imaging system. In fact, rather than simply not providing more resolution, the image can become worse as the aperture size increases, once the limit of the image detector is exceeded. This is because the large lens aperture provides excess or wasted spatial resolution that causes aliasing in the recorded image.

Aliasing occurs when the lens presents more spatial detail to the detector array than it can record. The spatial detail that is left over appears as incorrect, less detailed information. That is, the image has errors caused by the detailed information that is masquerading, or aliasing, as less detailed information. The detail limit that the detector array can handle is normally given in terms of line pairs per millimeter of resolution, or in terms of spatial frequency information in cycles per millimeter. When more spatial detail is presented to the detector than it can record, the higher spatial frequency information folds back into the lower frequency region, corrupting the image.

A similar effect occurs in electrical communication signals which are digitized and processed by telephones or television, when higher frequency information is supplied to the system than the system is prepared to process. Generally, the sampling frequency should be at least twice the highest frequency component in the signal. To prevent aliasing, a low pass or anti-aliasing filter is used to remove the high frequency data (analogous to the extra detail in an optical image) before the signal is sampled and processed. Up to now it has not generally been practical to design a low-pass optical spatial frequency filter to remove the excess image detail before the image is detected by the detector array. Many methods have been tried to lower the resolution of the image, with limited success.

The first method is simply to make the lens aperture smaller. This reduces the resolution of the image, but at the cost of reducing the amount of light captured by the system. The exposure time or illumination level must be increased to make up for the reduction of light.

Figure 1:
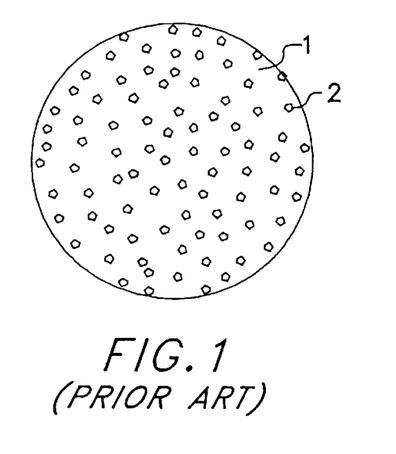
FIG. 1 (prior art) shows a prior art anti-aliasing system.

A second method, disclosed in U.S. Pat. No. 2,959,105 and shown in FIGS. 1 and 2, teaches the use of random, coplanar spots or phase steps 2 on an optical element 1, placed near the aperture stop of the imaging system, to provide random phase noise. This type of system is difficult to fabricate, due to specific statistical performance required of the random phase steps and the sharpness required of those steps. A similar system is described in U.S. Pat. No. 4,804,249, and shown in FIG. 3, which teaches the use of a plurality of coplanar optical plateaus on an optical element, the height of any two plateaus differing by more than the coherence length of the illumination, and requires relatively broadband illumination. Such a system is difficult and expensive to fabricate.

Figure 4:
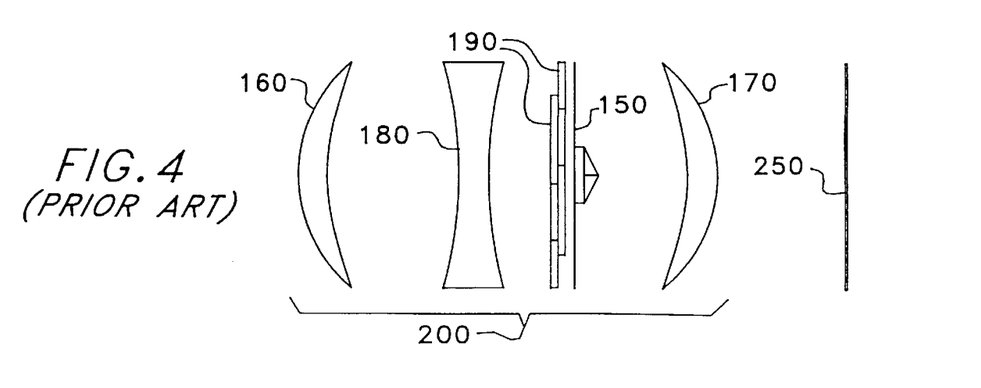
FIG. 4 (prior art) shows a prior art anti-aliasing system.
Figure 7:
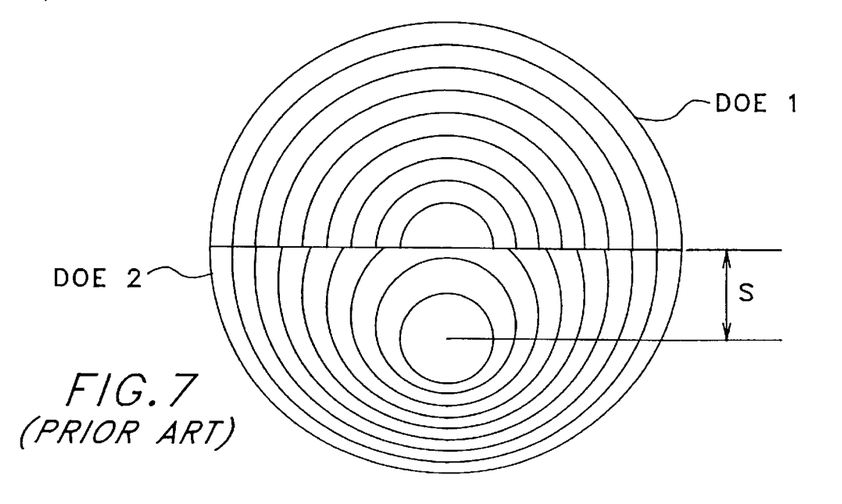
FIG. 7 (prior art) shows a prior art anti-aliasing system.

A third general method is to replicate the point spread function, resulting in a multiplicity of image points at the storage device for a single object point, thus spreading the light from a single object point over two or more capture elements (such as CCD elements). One example of such a system is disclosed in U.S. Pat. No. 4,989,959, which teaches the use of a pyramidal structure for forming several image points for a given object point. Like any symmetrical element, this element has a misfocus component and can confuse auto-focus systems (i.e. spatial bandwidth of the combined optical/element system is dependent on focus position). FIG. 4 (prior art) illustrates this system. Another system of this type is disclosed in U.S. Pat. No. 5,555,129, which teaches forming a lens having a plurality of regions acting as independent lenses, to form a replicated set of point spread functions. This element attenuates only a narrow range of spatial frequencies and is highly color dependent. FIG. 7 illustrates this element.

Figures 8, 9:
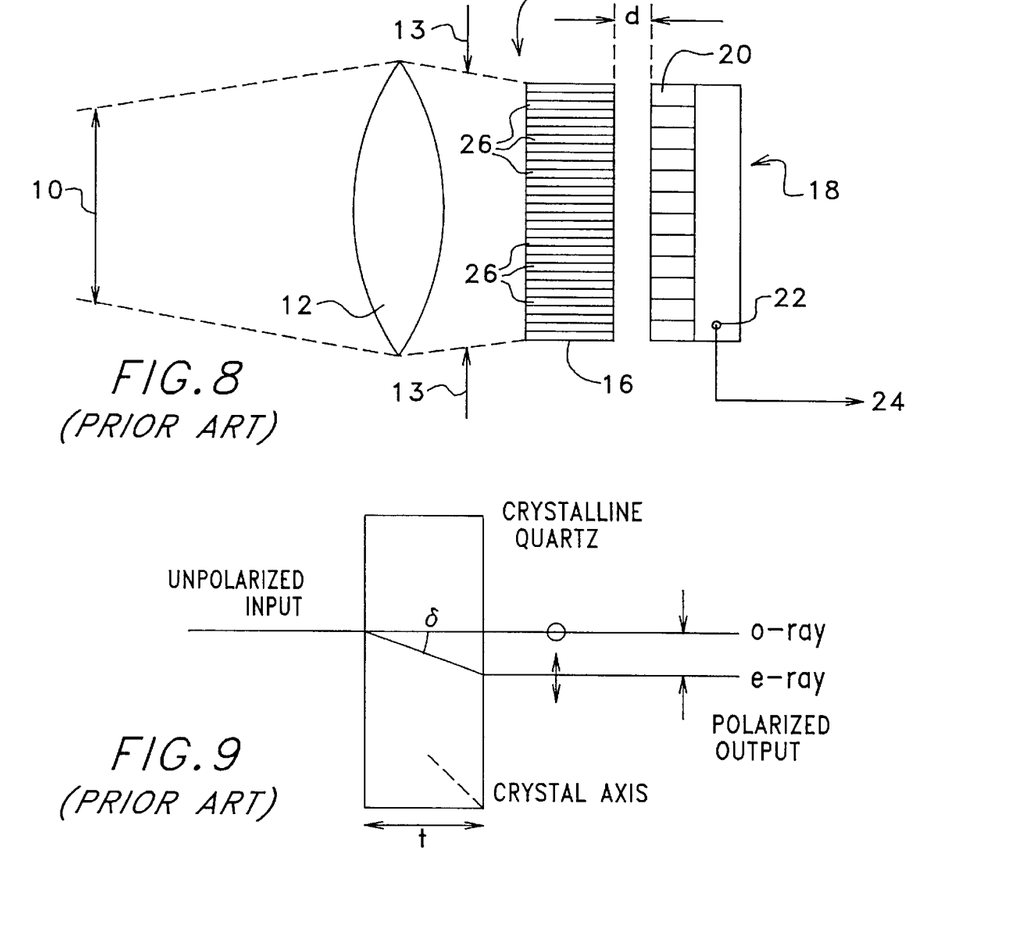
FIG. 8 (prior art) shows a prior art anti-aliasing system.
FIG. 9 (prior art) shows a prior art anti-aliasing system.

FIG. 9 illustrates another system of this type, which was disclosed in an article entitled "Color dependent optical prefilter for the suppression of aliasing artifacts," Applied Optics, vol. 29, no. 5 (Feb. 10, 1990) and described in U.S. Pat. No. 4,575,193. This system utilizes a birefringent crystal (made of quartz or the like) to generate two image points for a given object point (more image points may be generated by crossing a plurality of birefringent crystals). The input light cannot be is polarized, limiting the application of this system. It also takes up considerable space. All of the systems of this type suffer from the same disadvantage, namely that generating several image points for each object point attenuates only a narrow range of spatial frequencies. Expanding these systems to attenuate a greater range of frequencies requires the use of increasingly complex, difficult to fabricate, and bulky elements.

A fourth method involves placing an optical fiber bundle a specific distance from the detector array to deliberately blur the image. The fiber bundle must have the fibers at the output and the input arranged in exactly the same order, must be positioned accurately, and is expensive, difficult to customize, and requires considerable space. An example of this type of system is disclosed in U.S. Pat. No. 5,299,275. FIG. 8 shows the configuration taught in this patent. Element 16 uses the phase modifying characteristics of multimode optical fibers to attenuate high spatial frequency components.

Figure 5:
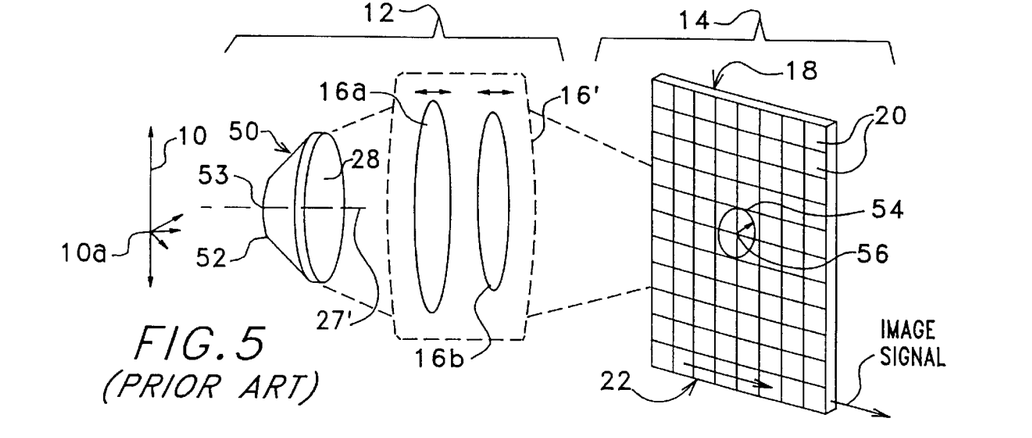
FIG. 5 (prior art) shows a prior art anti-aliasing system.
Figure 6:
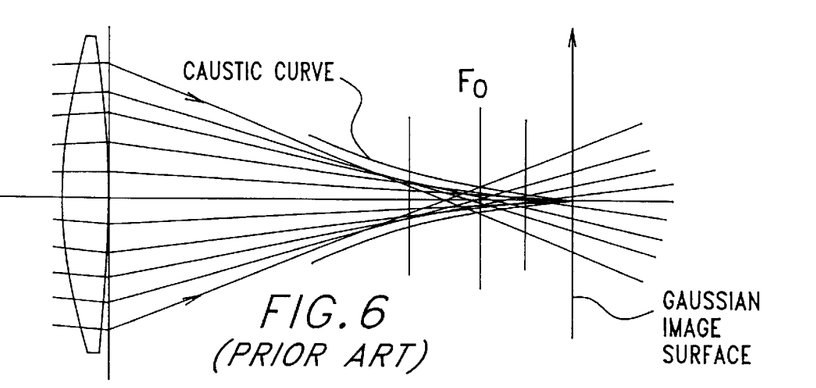
FIG. 6 (prior art) shows a prior art anti-aliasing system.

A fifth method involves deliberate use of misfocus or traditional lens aberrations to attenuate certain spatial frequencies. An example of this type of system is disclosed in U.S. Pat. No. 5,438,366, which teaches an element which forms a disk-like image of a single point (shown in FIG. 5). A second example of this type of system is disclosed in U.S. Pat. No. 5,270,825, which teaches utilizing spherical aberration to attenuate high spatial frequencies (shown in FIG. 6). Both of these systems are symmetrical, meaning they include a misfocus component which confuses auto-focus systems.

A need remains in the art for simple and inexpensive apparatus and methods to reduce the spatial resolution of an optical image to prevent aliasing, without requiring a reduction in the amount of light captured by the system, and without adversely affecting image quality or requiring complex optical systems.

SUMMARY OF THE INVENTION

It is an object of the present invention to provide simple and inexpensive apparatus and methods to reduce the resolution of an optical image to prevent aliasing, without requiring a reduction in the amount of light captured by the system, and without adversely affecting image quality or requiring complex optical systems.

The present invention modifies the wavefront of light passing through it in a curved, non-symmetrical manner chosen to attenuate high spatial frequencies in the light and form a low-pass anti-aliasing filter.

The optical anti-aliasing filter of the present invention is particularly useful in an optical system including an object and an image capturing device, and includes means for collecting light from the object, means for modifying a wavefront of the light collected from the object in a curved, non-symmetrical manner, and means for emanating the modified light for capture by the image capturing device. The means for modifying the wavefront is constructed and arranged to modify the wavefront such that the captured image is constrained to have optical power below a selected power limit outside a predetermined spatial frequency band-limit.

The means for modifying the wavefront of the light may comprise a number of transmissive elements, including a transmissive element formed of an optical material having varying thickness, a transmissive element formed of an optical material having varying index of refraction, a transmissive element formed of an array of spatial light modulators, and a transmissive holographic element. Any two or more of these elements may be combined, so long as the desired modification of the wavefront is accomplished. Further, the features of varying index of refraction, varying thickness, and holographic behavior may combined in a single element in any combination. A lens may be integrally formed with any of these wavefront modifying elements.

The means for modifying the wavefront of the light may comprise a number of reflective elements, including a reflective element formed of an optical material having an curved reflective surface, a transmissive element formed of an optical material having varying index of refraction and having a reflective back surface, a transmissive element formed of an array of spatial light modulators and having a reflective back surface, or a reflective hologram. Further, the wavefront modifying element could also comprise a combination of two or more of the above reflective elements.

Finally, the wavefront modifying element could also comprise a combination of one or more of the above transmissive elements and one or more of the above reflective elements.

DETAILED DESCRIPTION OF THE PREFERRED EMBODIMENT

Figure 10:
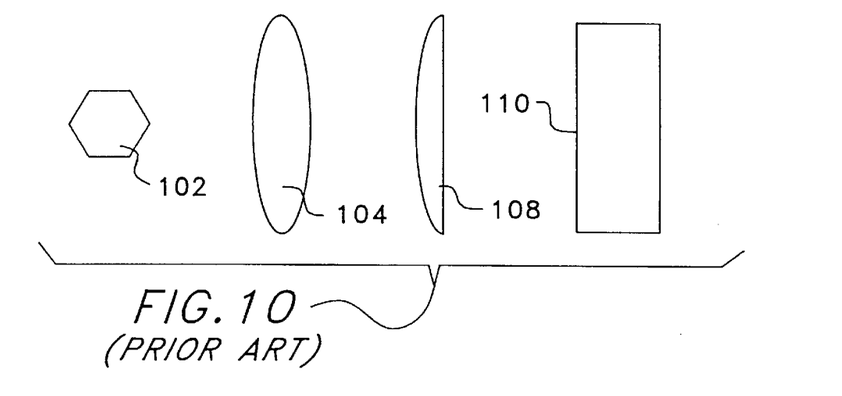
FIG. 10 (prior art) shows a conventional imaging system.

FIG. 10 (prior art) shows a conventional imaging system comprising an object 102, a lens 104 for focussing the light from object 102, and a CCD 110 for capturing a signal representing the light from object 102 as an array of values. Wavefront 108 is a bowl shaped surface, concave as seen by CCD 110, formed by lens 104 as it focusses the wavefront from object 102.

Figure 11:
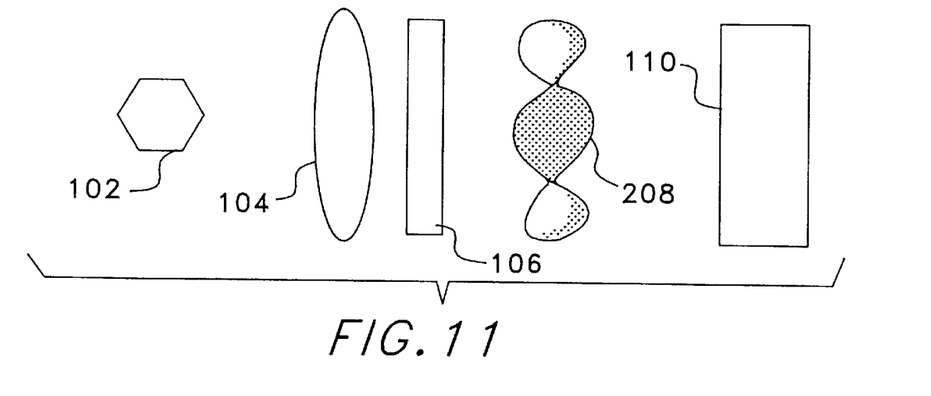
FIG. 11 shows an imaging system according to the present invention, including a transmissive anti-aliasing lowpass filter according to the present invention.

FIG. 11 shows a block diagram of the anti-aliasing filter (or optical mask) 106 of the present invention in use in an optical imaging system. Again, object 102 is recorded by charge coupled device (CCD) 110 via lens 106. Filter 106, which may be placed in front of or behind the lens, modifies the wavefront in a curved non-symmetric manner, removing the high spatial frequencies of the light and thus acting as a low pass filter. The manner of selecting an appropriate modification to be applied to the wavefront is described in detail in conjunction with FIG. 26.

The purpose of filter 106 is to reduce the resolution of the optical image to prevent aliasing, without reducing the amount of light captured by the system, and without adversely affecting image quality or requiring complex optical systems. Filter 106 accomplishes this purpose by modifying the phase of the light passing through the filter so as to produce a curved, non-symmetrical wavefront 208 in a manner which attenuates the high spatial frequency components of the light. Wavefront 208 in the present example resembles a potato chip, with its near edge displaced to the right (toward CCD 110) and its back edge displaced to the left (toward filter 106). The potato ship shape is also somewhat bowl shaped (as in FIG. 10), as the light is being focussed upon CCD 110.

While a CCD 110 is used as the image recording device in the embodiments described herein, other imaging detectors, including CMOS or digital detecting means, could be used in a similar manner.

Figure 12:
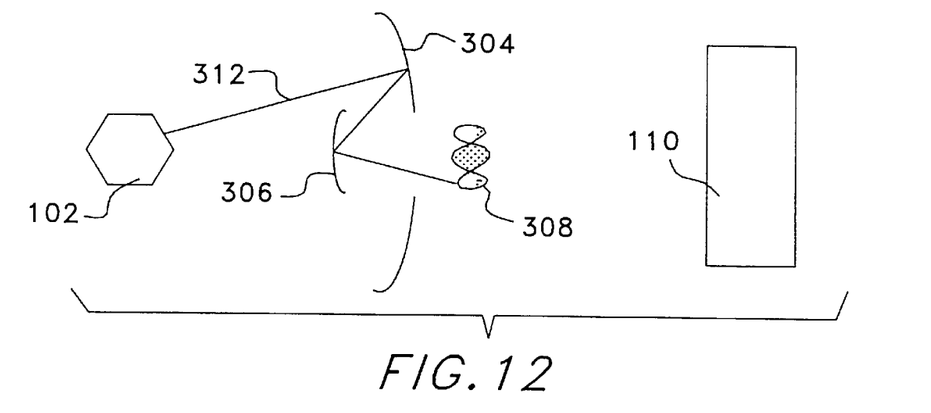
FIG. 12 shows an imaging system according to the present invention, including a reflective anti-aliasing lowpass filter according to the present invention.

FIG. 12 shows an imaging system according to the present invention, including a reflective anti-aliasing lowpass filter 306 according to the present invention.

Figure 13:
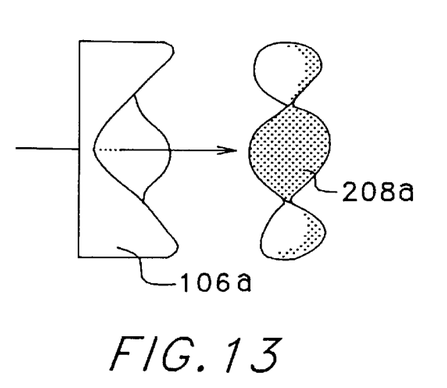
FIG. 13 shows a first embodiment of the transmissive anti-aliasing lowpass filter of FIG. 11.

FIG. 13 shows a first embodiment 106a of transmissive anti-aliasing lowpass filter 106 of FIG. 11. Filter 106a is a passive optical device, specifically a refraction-based optical device having curved variations in thickness (measured in the direction of the light passing through it), that when placed in the wavefront of light in an incoherent imaging system (such as that shown in FIG. 10) effectively attenuates spatial frequencies to values less than some desired small level for all spatial frequencies beyond a predetermined limit. The predetermined limit is generally related to the maximum spatial frequency of the imaging detector (in this case CCD 110). The variations of thickness of the filter effect variations in the phase of the wavefront, which effect the reduction in spatial resolution of the image.

Filter 106a might be formed of optical glass or plastic, by, for example, optical grinding, molding, casting, or compression.

Figure 14:
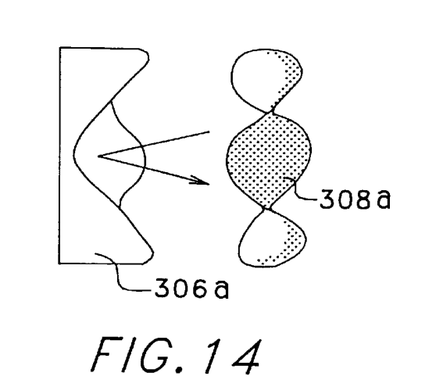
FIG. 14 shows a first embodiment of the reflective anti-aliasing lowpass filter of FIG. 12.

FIG. 14 shows a first embodiment 306a of the reflective anti-aliasing lowpass filter 306 of FIG. 12. Filter 306a comprises a mirrored surface that when placed in the path of the wavefront of light in an incoherent imaging system (such as that shown in FIG. 10) effectively attenuates spatial frequencies to values less than some desired small level for all spatial frequencies beyond a predetermined limit. Wavefront 308a produced by filter 306a has the same characteristics as wavefront 208a produced by transmissive filter 106a of FIG. 13.

Figure 15:
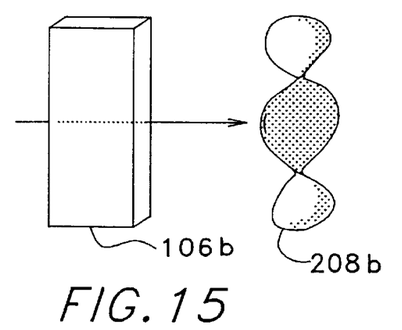
FIG. 15 shows a second embodiment of the transmissive anti-aliasing lowpass filter of FIG. 11.

FIG. 15 shows a second embodiment 106b of the transmissive anti-aliasing lowpass filter 106 of FIG. 11. Like filter 106a, filter 106b modifies the wavefront of the light from object 102 to form wavefront 208b. However, filter 106b is formed of optical material having a uniform thickness, but a spatially varying index of refraction. Thus, wavefront 208b has the same characteristics as wavefront 208a of FIG. 13.

Figure 16:
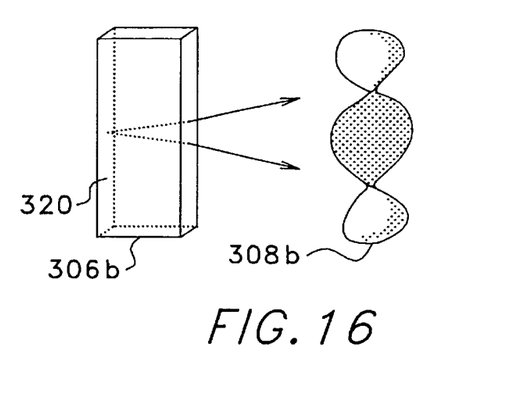
FIG. 16 shows a second embodiment of the reflective anti-aliasing lowpass filter of FIG. 12.

FIG. 16 shows a second embodiment 306b of the reflective anti-aliasing lowpass filter 306 of FIG. 12. Filter 306b is formed of an optical material of uniform thickness, but spatially varying index of refraction, like filter 106b of FIG. 15. It further includes a reflecting back surface 320 so that light enters on the right, passes once through filter 306b, reflects off the back surface, passes a second time through filter 306b, and exits with wavefront 308b. The variations in the index of refraction must be chosen keeping the double path through filter 306b in mind.

Figure 17:
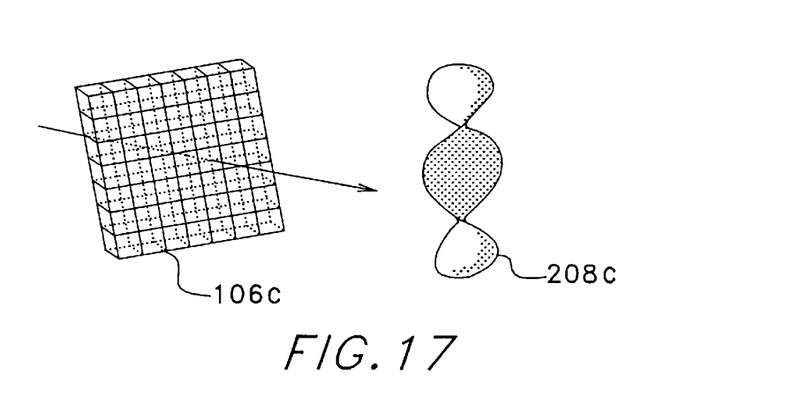
FIG. 17 shows a third embodiment of the transmissive anti-aliasing lowpass filter of FIG. 11.

FIG. 17 shows a third embodiment 106c of the transmissive anti-aliasing lowpass filter 106 of FIG. 11. Filter 106c comprises an array of spatial light modulators (SLMs) which affect the phase of light passing through them in such a manner as to produce desired wavefront 208c. While wavefront 208c is not curved identically to the wavefronts produced in FIGS. 13–16, the fact that SLM array 106c includes a great many elements makes it possible to produce an effectively curved wavefront 208c.

Figure 18:
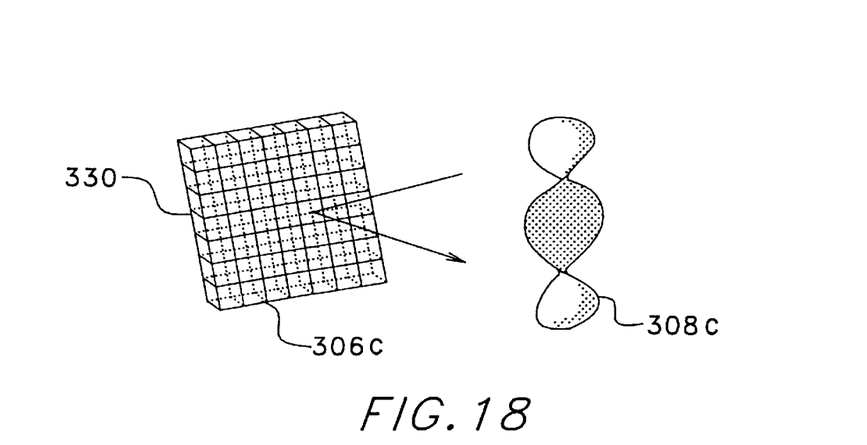
FIG. 18 shows a third embodiment of the reflective anti-aliasing lowpass filter of FIG. 12.

FIG. 18 shows a third embodiment 306c of the reflective anti-aliasing lowpass filter 306 of FIG. 12. Filter 306c comprises an array of spatial light modulators (SLMs) backed by reflective surface 330. The SLMs affect the phase of light passing through them in such a manner as to produce desired wavefront 308c. In designing filter 306c, notice must be taken of the double pass through each SLM. As in the case of filter 106c of FIG. 17, wavefront 308c, while not continuously curved, is effectively curved.

Figure 19:
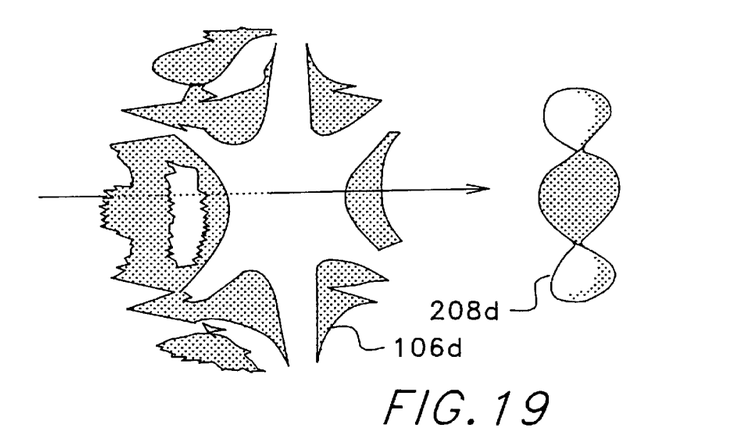
FIG. 19 shows a fourth embodiment of the transmissive anti-aliasing lowpass filter of FIG. 11.

FIG. 19 shows a fourth embodiment 106d of the transmissive anti-aliasing lowpass filter 106 of FIG. 11. Filter 106d is a diffractive filter, formed by designing a refractive filter such as filter 106a and then fabricating it modulo $N*\lambda$, where N is an integer and $\lambda$ is the wavelength of the illumination. In other words, portions of the 106d filter which are above a certain height (the height being a multiple of the light wavelength) are folded back down. This results in a filter which has less thickness than the 106d filter, but which is useful for only a narrow band of light frequencies. Light passing through filter 106d forms wavefront 208d.

Figure 20:
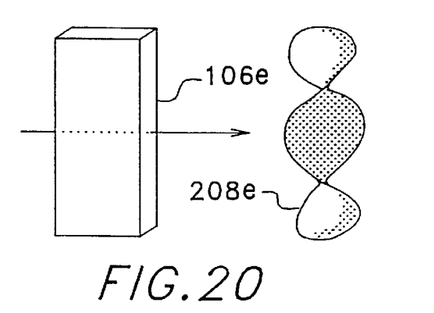
FIG. 20 shows a fifth embodiment of the transmissive anti-aliasing lowpass filter of FIG. 11.

FIG. 20 shows a fifth embodiment 106e of the transmissive anti-aliasing lowpass filter 106 of FIG. 11. Filter 106e is a transmissive holographic element, designed to produce the desired wavefront 208e. The technique for designing transmissive holographic elements to produce any desired wavefront is well known to those skilled in the art. The hologram could simultaneously include the effect of lens 104, eliminating the need for that element.

Figure 21:
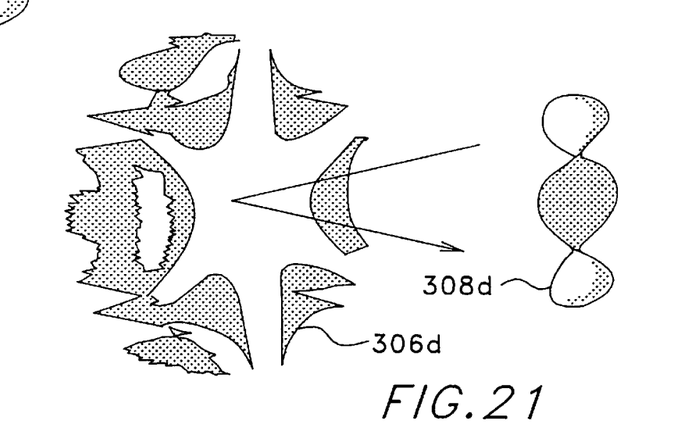
FIG. 21 shows a fourth embodiment of the reflective anti-aliasing lowpass filter of FIG. 12.

FIG. 21 shows a fourth embodiment 306d of the reflective anti-aliasing lowpass filter 306 of FIG. 12. Filter 306d is formed by designing a reflective filter such as 306a and fabricating it modulo $N*\lambda$, where N is an integer and $\lambda$ is the wavelength of the illumination. Light reflecting from filter 306d forms wavefront 308d.

Figure 22:
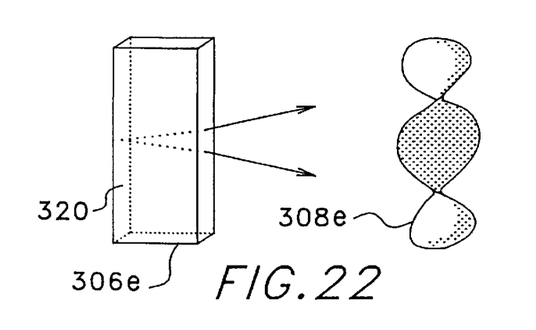
FIG. 22 shows a fifth embodiment of the reflective anti-aliasing lowpass filter of FIG. 12.

FIG. 22 shows a fifth embodiment 306e of reflective anti-aliasing lowpass filter 306 of FIG. 12. Filter 306e is a reflective holographic element, designed to produce the desired wavefront 308e. The technique for designing reflective holographic elements to produce any desired wavefront is well known to those skilled in the art. The hologram could simultaneously include the effect of mirror 304, eliminating the need for that element.

Figure 23:
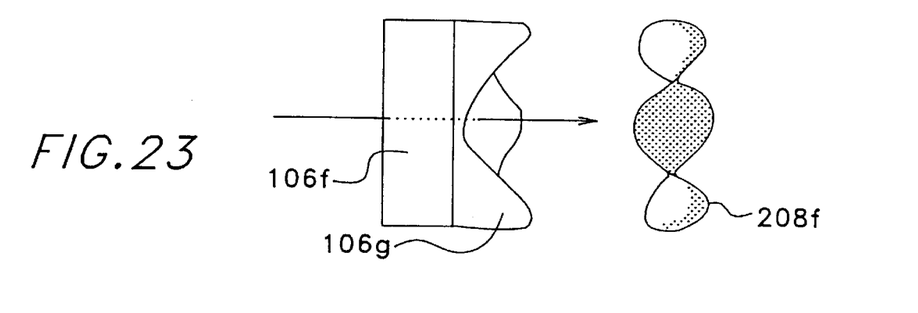
FIG. 23 shows a sixth embodiment of the transmissive anti-aliasing lowpass filter of FIG. 11, combining two filter elements.

FIG. 23 shows a sixth embodiment of the transmissive anti-aliasing lowpass filter 106 of FIG. 11, combining two filter elements 106f and 106g. Those skilled in the art will appreciate that any two or more of the foregoing transmissive or reflective elements may be combined, so long as the resulting wavefront has the desired characteristics. In this case element 106f has uniform thickness and spatially varying index of refraction, while element 106g has uniform index of refraction and varying thickness. Light passing through both elements has wavefront 208f. Note that the features of varying thickness and varying index of refraction could also be combined in a single element.

Figure 24:
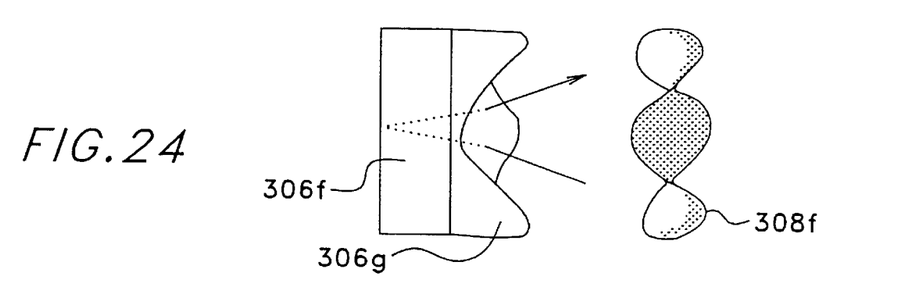
FIG. 24 shows a sixth embodiment of the reflective anti-aliasing lowpass filter of FIG. 12, combining two filter elements.

FIG. 24 shows a sixth embodiment of the reflective anti-aliasing lowpass filter 306 of FIG. 12, combining two filter elements 306f and 306g. Element 306f has uniform thickness and spatially varying index of refraction, while element 306g has uniform index of refraction and varying thickness. Element 306f further includes a reflective back surface 331. Light passes from the right through element 306g, through element 306f, reflects off surface 331, passes back through 306f and 306g, and forms wavefront 308f.

Figure 25:
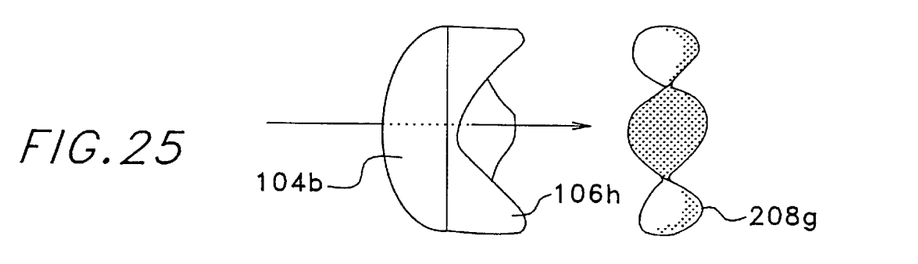
FIG. 25 shows a seventh embodiment of the transmissive anti-aliasing lowpass filter of FIG. 11, combining a filter element with a lens.

FIG. 25 shows a seventh embodiment of the transmissive anti-aliasing lowpass filter 106 of FIG. 11, combining a filter element 106h with a lens 104b. Lens 104b could be in place of lens 104 in FIG. 11, or both could be used. Filter 106h affects the phase of the light, while lens 104b focusses the light, forming wavefront 208g. Those skilled in the art will appreciate that other filters described herein could also be combined with a lens, and that the lens could be refractive or diffractive.

Figure 2:
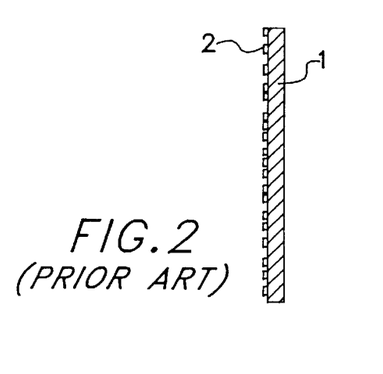
FIG. 2 (prior art) shows a prior art anti-aliasing system.
Figure 26:
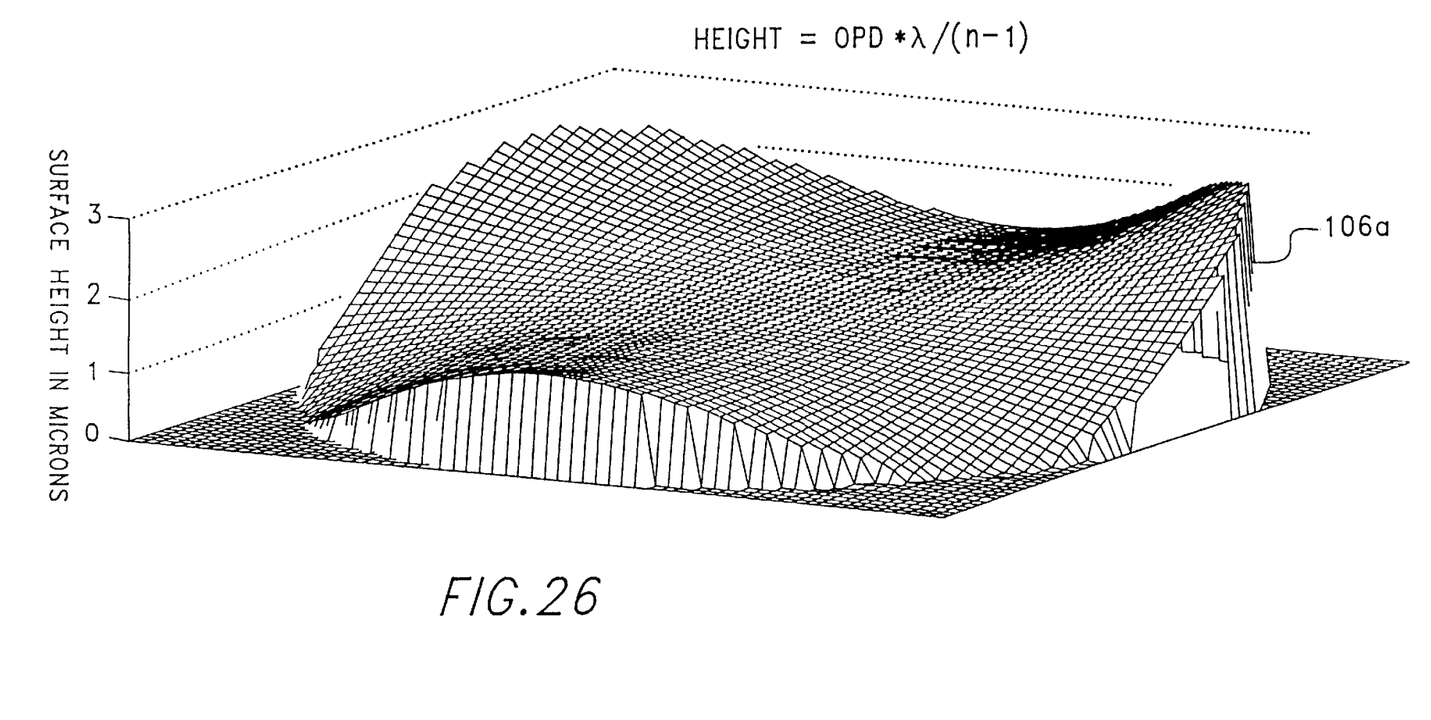
FIG. 26 shows a more detailed plot of the transmissive filter of FIG. 13.

FIG. 26 shows a more detailed plot of transmissive filter 106a of FIG. 13. FIG. 26 is an isometric drawing of anti-aliasing filter 106a. Note that h=OPD*λ/(n−1), where λ=wavelength and n=index of refraction. In general, the light can enter either the top or the bottom surface of filter 106a. Filter 106a is designed specifically to work with CCD 110a, shown in FIG. 27. The design process is illustrated by the following example:

The optical system includes an ideal diffraction-limited lens of focal length 11 mm with an f-number of 4.5, and the CCD 108 of FIG. 2. The bandlimits are chosen to match the maximum spatial frequency in the vertical and horizontal direction of CCD 108. The constraint chosen for this example requires that the magnitude of the sampled MTF outside these spatial frequency bandlimits not exceed 15% of the maximum value of the MTF (or MTF(0,0)).

Figure 27:
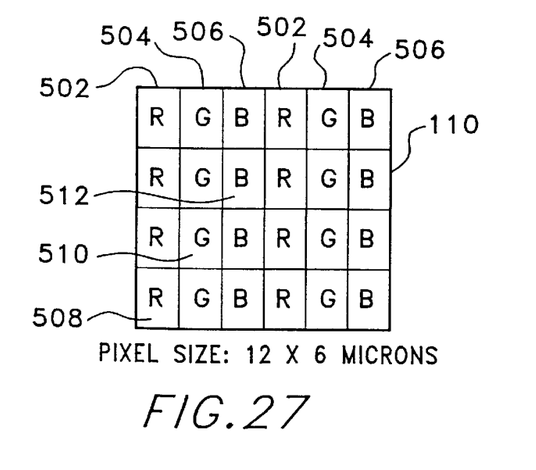
FIG. 27 shows an example of the charge coupled device (CCD) array of FIGS. 11 and 12 for digitally recording an optical image.

FIG. 27 shows a specific example of a charge coupled device (CCD) array 110 for digitally recording an optical image. This particular CCD (having 600 by 1600 video pixels) is commercially available from Polaroid, and provides a good illustration of the concepts of the present invention. For this example color CCD 110 is used as an image capture device where columns of the CCD are made of contiguous pixels of the same color, with every third column having the same color. Thus, the required reduction in spatial resolution is different in the vertical direction than in the horizontal direction.

Columns 502 are made of contiguous red pixels 508, columns 504 are made of contiguous green pixels 510, and columns 506 are made of contiguous blue pixels 512. The length of a pixel is 12 microns and the width is 6 microns. The fill factor in the vertical direction for each color is around 99% while the horizontal fill factor for each color is around 33%. With a fill factor of near 100 percent, sampling in the vertical direction generally describes typical grayscale image sampling. In other words, each pixel has a color filter in front of it which allows only that color of light to pass through, and active pixels are vertically adjacent. With a fill factor of 30 percent for each color, sampling in the horizontal direction generally describes typical color imager sampling, where active pixels are spatially separated.

The goal in this example is to achieve an OTF magnitude (MTF), measured at and beyond the horizontal and vertical CCD bandlimits (27.7 lp/mm and 41.6 lp/mm respectively), of less than 0.15, or equivalently, the sampled spatial frequency power, IOTFI$^2$, measured at and beyond the same horizontal and vertical CCD bandlimits, of less than 0.15$^2$ or 0.025.

The value of the MTF at zero spatial frequency, or IH(0,0)I, is defined to be unity. The CCD pixels are sized 12×6 microns and arranged as shown in FIG. 27. The design wavelength is 0.5 microns and the system F/number is F/4.5. The theoretical cutoff spatial frequency of the lens is 1/(lambda*F/number)=444.4 lp/mm.

The goal of dramatically reducing the overall system response beyond 27.7 lp/mm in the horizontal direction and 41.6 lp/mm in the vertical direction is achieved by designing a function p(x,y) that forms a wavefront, P(x,y)=exp(jp(x,y)), and corresponding OTF H(u,v) that satisfies these specs when used with the specific detector selected. One function p(x,y) that does satisfy these specs is given by:

$$p(x,y)=y^3(a+b)+yx^2(3a-b)$$

$$x^2+y^2 \leq 1$$

$$a, b \text{ real}$$

The constants a and b are selected to control the horizontal and vertical spatial frequency bandwidths of the optical system. If b=−3a, then a circularly symmetric MTF results. This MTF can be approximated as $$MTF(u, v) \approx \frac{\pi/3}{\sqrt{a^2(u^2+v^2)}} = \frac{\pi/3}{a \cdot r}$$

where $r^2=u^2+v^2$

By choice of the constant "a" the value of the MTF beyond some spatial frequency limit can be made as small as needed. For the specific CCD 110 of FIG. 27, choosing a=10 and b=−22 results in a normalized function $$p(x,y)=12y^3-52yx^2$$

$$x^2+y^2 \leq 1$$

The corresponding wavefront, again in normalized spatial coordinates, is given by:

$$P(x,y)=e^{j \cdot k(12y^3-52yx^2)},$$

$$x^2+y^2 \leq 1$$

with $k = \dfrac{2\pi}{\lambda}$

λ=wavelength of illumination $$j = \sqrt{-1}$$

To convert from normalized spatial coordinates to physical units, the phase function p(x,y) is scaled so that the maximum phase deviation is kept constant.

Figure 30:
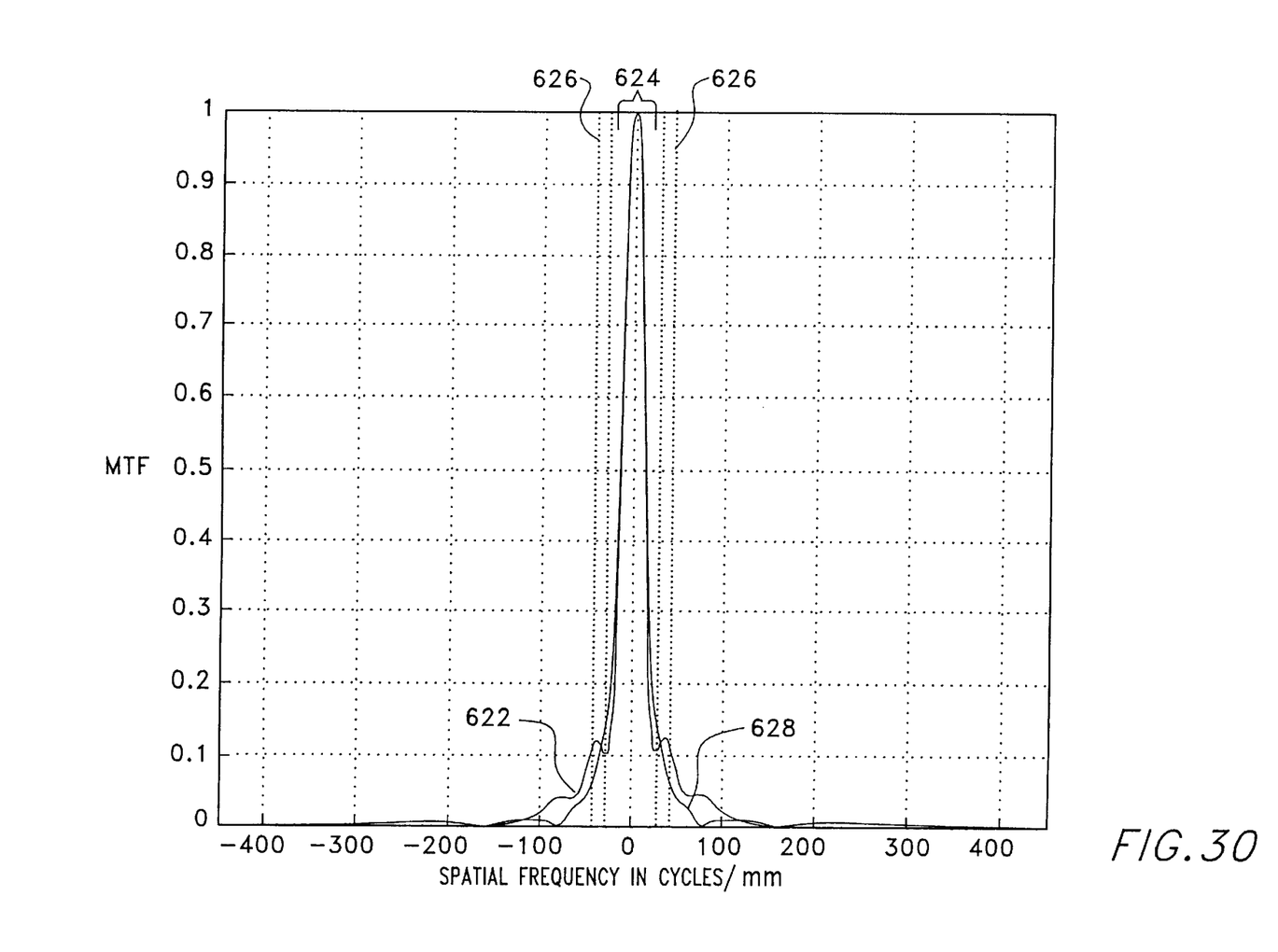
FIG. 30 shows a plot of light intensity versus spatial frequency of the signal captured by the CCD, for an idealized example using the anti-aliasing filter of FIGS. 13 and 26.

The maximum phase deviation of this function is 5.7 wavelengths. As seen in FIG. 30, this phase function, in conjunction with the natural CCD spatial averaging for the selected detector geometry, does attenuate all spatial frequencies below the specified design limits. Very little spatial frequency power exists outside of the horizontal and vertical spatial frequency bandlimits.

Figure 28:
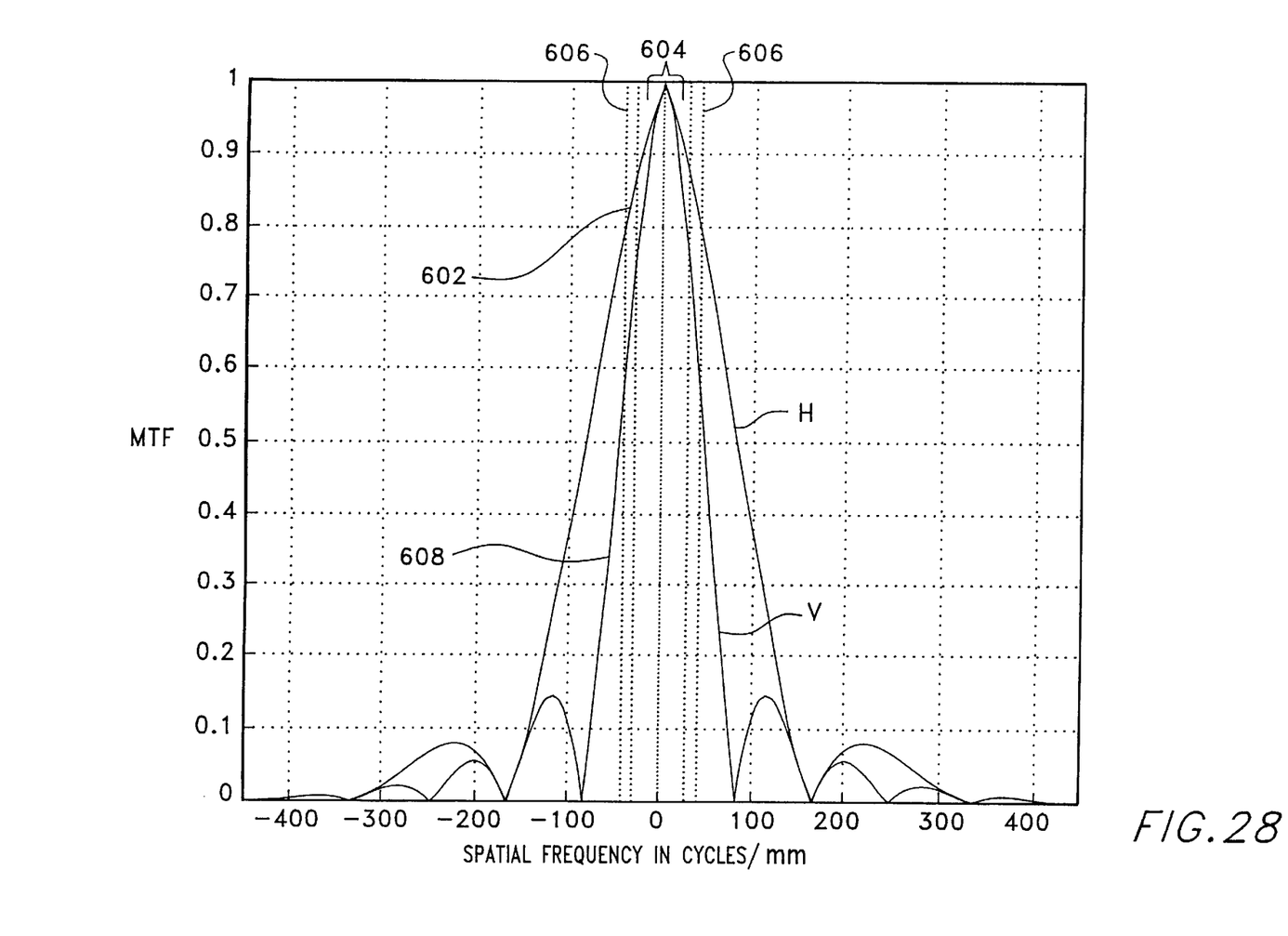
FIG. 28 shows a plot of light intensity versus spatial frequency for the signal captured by the CCD, for an idealized example of light that is confined to one pixel.
Figure 29:
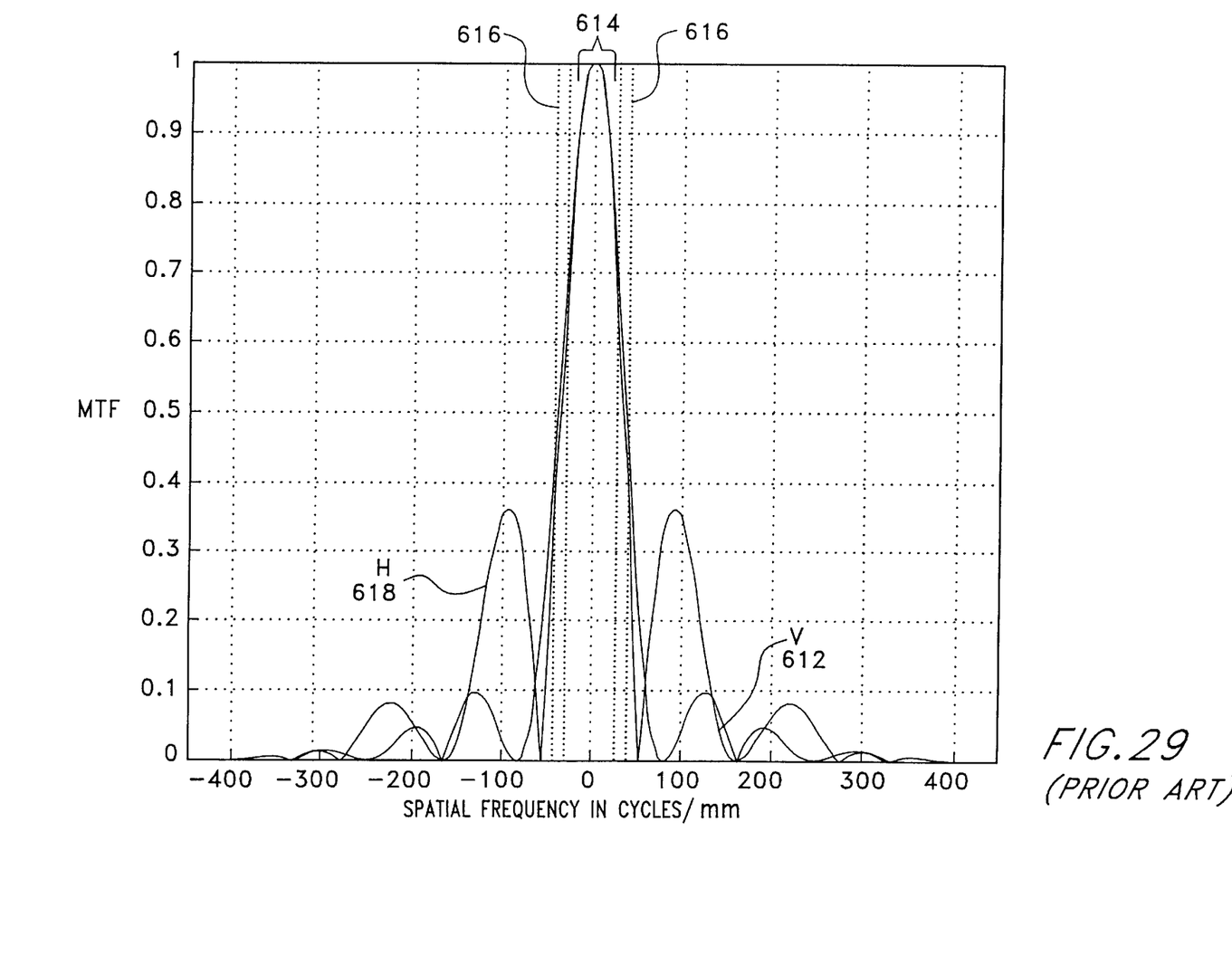
FIG. 29 (prior art) shows a plot of light intensity versus spatial frequency of the signal captured by the CCD, for an idealized example using a prior art anti-aliasing filter.

FIGS. 28–30 compare the performance of the present invention to similar imaging systems utilizing no antialiasing measures and a prior art anti-aliasing device. FIG. 28 shows magnitude versus spatial frequency plots for an optical imaging system like that shown in FIG. 10, absent any anti-aliasing filter. FIG. 29 shows a similar plot for the optical system utilizing a prior art anti-aliasing filter. FIG. 30 shows magnitude versus spatial frequency plots for the optical system utilizing anti-aliasing filter 106a, shown in FIGS. 13 and 24.

FIG. 28 shows plots 602 and 608 of light intensity versus spatial frequency for the signal captured by CCD 110, for an idealized example of light that focusses to a small spot on one pixel. This is equivalent to the MTF of diffraction limited lens 104, in this example an ideal diffraction-limited lens of focal length 11 mm with an f-number of 4.5, including the spatial averaging effect of CCD 110.

Also shown is the vertical spatial frequency bandlimit 606 and the horizontal spatial bandlimit 604 for the assumed CCD for no aliasing to occur. FIG. 27 shows that the horizontal spacing between identically colored pixels is three times the width of a single pixel. The vertical spacing is equal to the height of a single pixel. Therefore, the horizontal bandlimit 604 is tighter than the vertical bandlimit 606. Since there is significant MTF power outside of the needed bandlimits, a large amount of aliasing will occur if the lens/CCD combination is used as-is.

This idealized case is unrealistic, in assuming that no inherent low pass filtering occurs in the system (except the inherent spatial averaging of the CCD pixels capturing the light signal). Physical aberrated lenses, for example, inherently possess some low pass filtering characteristics. This example provides a good illustration of the present invention, since aliasing is very pronounced.

Plot 608 shows light intensity versus vertical spatial frequency (for a vertical slice through the center of the 2-D OTF), while plot 602 is the related horizontal spatial frequency plot. Horizontal plot 602 is much broader than vertical plot 608, because of the combination of the lower fill factor horizontally, and the broader sampling period horizontally (refer to equation 9 for the specific relationship). Again, the horizontal bandlimit 604 is tighter than the vertical bandlimit 606 because the center-to-center distance between single color pixels is greater in the horizontal direction than in the vertical direction.

FIG. 29 (prior art) shows plots 612, 618 of light intensity versus spatial frequency of the signal captured by CCD 110, including the spatial averaging effect of CCD 110, for the idealized case using a prior art anti-aliasing filter (described in "Color Dependent Optical Prefilter for the Suppression of Aliasing Artifacts," by J. E. Greivenkamp, Applied Optics, Vol. 29, No. 5Feb. 10 1990). This prior art filter basically uses two of the elements shown in FIG. 9, crossed to form four image point for every object point.

This type of low pass filter approximation uses crossed birefringent crystals to, in effect, transform one ray of light propagating towards the CCD into four rays. By choosing the distance between the rays via the thickness of the crystal, various sine wave types of low pass filter approximations can be formed. The specific type used for this simulation effects a sine wave in spatial frequency with the first zero of the sine wave coinciding with the sampling frequency. This type of low pass filter still allows a considerable amount of spatial frequency power to be aliased after sampling.

Plot 612 is the plot of intensity versus spatial frequency for the vertical direction, while plot 618 is the plot of intensity versus spatial frequency for the horizontal direction. Horizontal plot 508 is much broader than vertical plot 612, because of the combination of the lower fill factor horizontally, and the broader sampling period horizontally. Again, the horizontal bandlimit 614 is tighter than the vertical bandlimit 616 because the center-to-center distance between single color pixels is greater in the horizontal direction than in the vertical direction.

Figure 3:
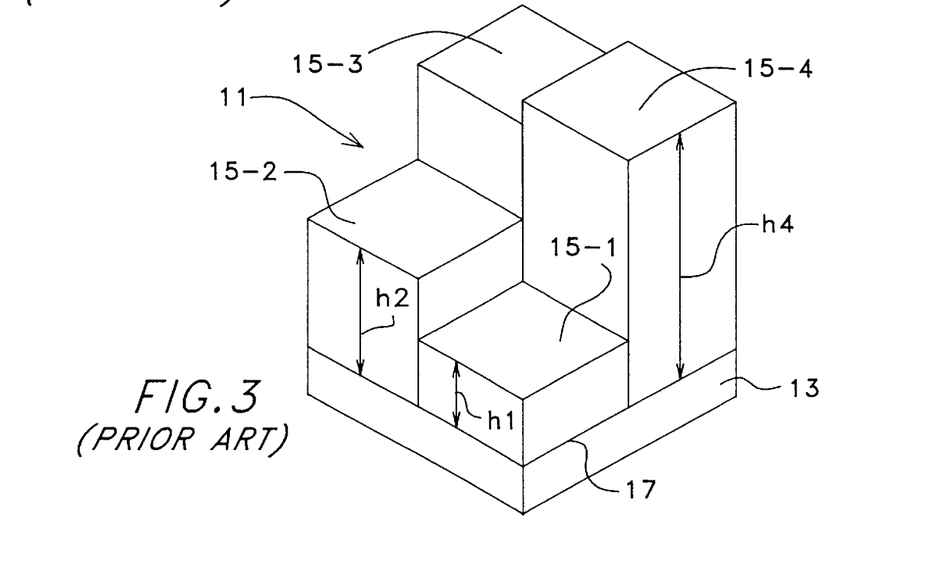
FIG. 3 (prior art) shows a prior art anti-aliasing system.

FIG. 30 shows magnitude versus spatial frequency plots for the optical system utilizing an anti-aliasing filter according to the present invention. Anti-aliasing filter 106a is shown in FIG. 26. FIG. 30 shows plots 622, 628 of light intensity versus spatial frequency of the signal stored by CCD 110 (including the spatial averaging effects of CCD 110) for the idealized case of FIG. 3, given anti-aliasing filter 106a of FIG. 24. FIG. 30 shows the horizontal and vertical MTFs of the example lens, including the CCD spatial averaging, after modification with anti-aliasing filter 106a. Very little spatial frequency power, when compared to FIGS. 28 and 29, is present outside bandlimits 624, 626.

Figure 31:
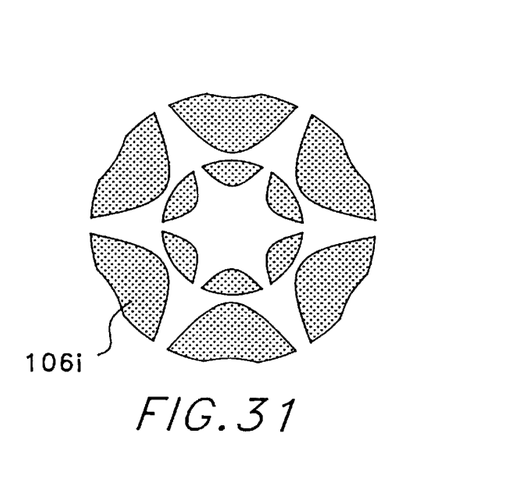
FIG. 31 shows an eighth transmissive embodiment of the transmissive anti-aliasing lowpass filter of FIG. 11, for use in a system with two stopped down aperture positions.

FIG. 31 shows an eighth transmissive embodiment 106i of the transmissive anti-aliasing lowpass filter 106 of FIG. 11, for use in a system with two stopped down aperture positions. In general, an anti-aliasing filter that operates at a number of discrete aperture stops is composed of a series of ring-shaped structures. For example, assume an anti-aliasing filter that operates at full aperture and at one-half aperture is needed. One form of the phase function p(x,y) is:

$$p(x, y) = \begin{cases} y^3(a_1 + b_1) + yx^2(3a_1 - b_1), & x^2 + y^2 \leq (1/2)^2 \\ y^3(a_2 + b_2) + yx^2(3a_2 - b_2), & (1/2)^2 < x^2 + y^2 \leq 1 \end{cases}$$

with $a_1$, $b_1$, $a_2$, $b_2$ real constants.

By choice of the constants $a_1$, $b_1$, $a_2$, and $b_2$, desired horizontal and vertical spatial frequency bandwidths for a system using both the full and half aperture positions can be obtained. For simplicity, assume that the digital detector used is symmetric in the horizontal and vertical directions. Then a circularly symmetric OTF can be used and the constants $b_1$ and $b_2$ can be selected as $b_1 = -3a_1$, $b_2 = -3a_2$. It can be shown that the spatially normalized form of the two-aperture anti-aliasing filter can be written in polar coordinates as:

$$p(r, \theta) = \begin{cases} a_1 r^3 \cos(3\theta), & r \leq 1/2, |\theta| \leq \pi \\ a_2 r^3 \cos(3\theta), & 1/2 < r \leq 1, |\theta| \leq \pi \end{cases}$$

$$p(r, \theta) = \begin{cases} a_1 r^3 \cos(3\theta), & r \leq 1/2, |\theta| \leq \pi \\ a_2 r^3 \cos(3\theta), & 1/2 < r \leq 1, |\theta| \leq \pi \end{cases}$$

At the ½ aperture position, the constant a1 is chosen to give the desired symmetric horizontal and vertical spatial frequency bandwidths. The constant a2 is chosen when using the full aperture, with a1 fixed, to again give the desired spatial frequency bandwidths. This procedure can be extended to design an anti-aliasing filter that operates over any number of aperture positions.

Note in FIG. 31 that filter 106i comprises an inner circular portion resembling filter 106d of FIG. 19, and an outer ring-shaped portion resembling a larger version of filter 106d with its center removed.

While the exemplary preferred embodiments of the present invention are described herein with particularity, those skilled in the art will appreciate various changes, additions, and applications other than those specifically mentioned, which are within the spirit of this invention. For example, both the top surface and the bottom surface of the filter may vary, so long as the desired phase variations on the wavefront are achieved. Additionally, some magnitude filtering (in addition to the phase filtering described herein) may in some cases assist in the reduction of image spatial resolution, when the loss of light is acceptable.

What is claimed is:

1. An optical anti-aliasing filter for use in an optical system including an object and an image capturing device, said filter comprising:

means for collecting light from the object;

means for modifying a wavefront of the light collected from the object in a curved, rotationally non-symmetrical manner; and means for emanating the modified light for capture by the image capturing device;

wherein the means for modifying the wavefront is constructed and arranged to modify the wavefront such that the captured image is constrained to have optical power below a selected power limit outside a predetermined spatial frequency bandlimit; and wherein the filter comprises a central structure and at least one concentric ring shaped structure disposed about the central structure, for allowing the filter to operate at full aperture and at least one stopped down position.

2. The filter of claim 1, wherein the phase function of each structure of the filter is approximately a cubic phase function.

3. The filter of claim 1, wherein the filter comprises a central structure and a single concentric ring structure, for allowing the filter to operate at full aperture and half aperture.

4. The filter of claim 3, wherein the phase function of each structure of the filter is approximately a cubic phase function.

5. The filter of claim 4, wherein the phase function of the filter is described by a function having approximately the following form:

$$P(x, y) = \begin{cases} a_1 x^3 + b_1 y^3, & x^2 + y^2 \le (1/2)^2 \\ a_2 x^3 + b_2 y^3, & (1/2)^2 < x^2 + y^2 \le 1 \end{cases}$$

with $a_1, b_1, a_2, b_2$ real constants.

6. The filter of claim 4, wherein the phase function of the filter is described by a function having approximately the following form:

$$P(x, y) = \begin{cases} a_1 x^3 + b_1 y^3 + c_1 x^2 y + d_1 xy^2, & x^2 + y^2 \le (1/2)^2 \\ a_2 x^3 + b_2 y^3 + c_2 x^2 y + d_2 xy^2, & (1/2)^2 < x^2 + y^2 \le 1 \end{cases}$$

with $a_1, b_1, a_2, b_2, c_1, c_2, d_1, d_2$ real constants.

7. The filter of claim 4, wherein the phase function of the filter is described by a function having approximately the following form:

$$P(x, y) = \begin{cases} y^3(a_1 + b_1) + yx^2(3a_1 - b_1), & x^2 + y^2 \le (1/2)^2 \\ y^3(a_2 + b_2) + yx^2(3a_2 - b_2), & (1/2)^2 < x^2 + y^2 \le 1 \end{cases}$$

with $a_1, b_1, a_2, b_2$ real constants.

8. The filter of claim 4, wherein the phase function of the filter is described by a function having approximately the following form:

$$P(x, y) = \begin{cases} 12a_1 y^3 + 52b_1 yx^2, & x^2 + y^2 \le (1/2)^2 \\ 12a_2 y^3 + 52b_2 yx^2, & (1/2)^2 < x^2 + y^2 \le 1 \end{cases}$$

with $a_1, b_1, a_2, b_2$ real constants.

9. A method of reducing the spatial resolution of an image formed from light transmitted through an incoherent optical system comprising the steps of:

transmitting light for forming the image through the optical system to an image location;

affecting the phase of a wavefront of the light in a curved, rotationally non-symmetrical manner; and capturing an image at the image location;

wherein the phase affecting step affects the phase such that the image formed is constrained to have optical power below a selected power limit outside a predetermined spatial frequency bandlimit; and wherein the phase affecting step is accomplished by a phase filter comprising a central structure and at least one concentric ring shaped structure disposed about the central structure, for allowing the filter to operate at full aperture and at least one stopped down position.

10. The method of claim 9, wherein the phase function of each structure of the filter is approximately a cubic phase function.

11. The method of claim 9, wherein the filter comprises a central structure and a single concentric ring structure, for allowing the filter to operate at full aperture and half aperture.

12. The method of claim 11, wherein the phase function of each structure of the filter is approximately a cubic phase function.

13. The method of claim 12, wherein the phase function of the filter is described by a function having approximately the following form:

$$P(x, y) = \begin{cases} a_1 x^3 + b_1 y^3, & x^2 + y^2 \le (1/2)^2 \\ a_2 x^3 + b_2 y^3, & (1/2)^2 < x^2 + y^2 \le 1 \end{cases}$$

with $a_1, b_1, a_2, b_2$ real constants.

14. The method of claim 12, wherein the phase function of the filter is described by a function having approximately the following form:

$$P(x, y) = \begin{cases} a_1 x^3 + b_1 y^3 + c_1 x^2 y + d_1 xy^2, & x^2 + y^2 \le (1/2)^2 \\ a_2 x^3 + b_2 y^3 + c_2 x^2 y + d_2 xy^2, & (1/2)^2 < x^2 + y^2 \le 1 \end{cases}$$

with $a_1, b_1, a_2, b_2, c_1, c_2, d_1, d_2$ real constants.

15. The method of claim 12, wherein the phase function of the filter is described by a function having approximately the following form:

$$P(x, y) = \begin{cases} y^3(a_1 + b_1) + yx^2(3a_1 - b_1), & x^2 + y^2 \le (1/2)^2 \\ y^3(a_2 + b_2) + yx^2(3a_2 - b_2), & (1/2)^2 < x^2 + y^2 \le 1 \end{cases}$$

with $a_1$, $b_1$, $a_2$, $b_2$ real constants.

16. The method of claim 12, wherein the phase function of the filter is described by a function having approximately the following form:

$$P(x, y) = \begin{cases} 12a_1 y^3 + 52b_1 yx^2, & x^2 + y^2 \le (1/2)^2 \\ 12a_2 y^3 + 52b_2 yx^2, & (1/2)^2 < x^2 + y^2 \le 1 \end{cases}$$

with $a_1$, $b_1$, $a_2$, $b_2$ real constants.

17. An optical imaging system disposed between an object and an image plane comprising:
 a lens;
 an anti-aliasing filter; and means for capturing the image formed at the image plane;
 wherein the anti-aliasing filter comprises means for modifying the phase front of light from the object in a curved and rotationally non-symmetric manner; such that the captured image is constrained to have optical power below a selected power limit outside a predetermined spatial frequency bandlimit; and
 wherein the anti-aliasing filter comprises a central structure and at least one concentric ring shaped structure disposed about the central structure, for allowing the filter to operate at full aperture and at least one stopped down position.

18. The filter of claim 17, wherein the phase function of each structure of the filter is approximately a cubic phase function.

19. The filter of claim 17, wherein the filter comprises a central structure and a single concentric ring structure, for allowing the filter to operate at full aperture and half aperture.

20. The filter of claim 19, wherein the phase function of each structure of the filter is approximately a cubic phase function.

21. The filter of claim 20, wherein the phase function of the filter is described by a function having approximately the following form:

$$P(x, y) = \begin{cases} a_1 x^3 + b_1 y^3, & x^2 + y^2 \le (1/2)^2 \\ a_2 x^3 + b_2 y^3, & (1/2)^2 < x^2 + y^2 \le 1 \end{cases}$$

with $a_1$, $b_1$, $a_2$, $b_2$ real constants.

22. The filter of claim 20, wherein the phase function of the filter is described by a function having approximately the following form:

$$P(x, y) = \begin{cases} a_1 x^3 + b_1 y^3 + c_1 x^2 y + d_1 xy^2, & x^2 + y^2 \le (1/2)^2 \\ a_2 x^3 + b_2 y^3 + c_2 x^2 y + d_2 xy^2, & (1/2)^2 < x^2 + y^2 \le 1 \end{cases}$$

with $a_1$, $b_1$, $a_2$, $b_2$, $c_1$, $c_2$, $d_1$, $d_2$ real constants.

23. The filter of claim 20, wherein the phase function of the filter is described by a function having approximately the following form:

$$P(x, y) = \begin{cases} y^3(a_1 + b_1) + yx^2(3a_1 - b_1), & x^2 + y^2 \le (1/2)^2 \\ y^3(a_2 + b_2) + yx^2(3a_2 - b_2), & (1/2)^2 < x^2 + y^2 \le 1 \end{cases}$$

with $a_1$, $b_1$, $a_2$, $b_2$ real constants.

24. The filter of claim 20, wherein the phase function of the filter is described by a function having approximately the following form:

$$P(x, y) = \begin{cases} 12a_1 y^3 + 52b_1 yx^2, & x^2 + y^2 \le (1/2)^2 \\ 12a_2 y^3 + 52b_2 yx^2, & (1/2)^2 < x^2 + y^2 \le 1 \end{cases}$$

with $a_1$, $b_1$, $a_2$, $b_2$ real constants.

\* \* \* \* \*